Dec. 29, 1931. C. G. GARRARD 1,838,304
MACHINE TOOL
Filed Sept. 23, 1929    2 Sheets-Sheet 1

Inventor
Charles George Garrard
By B. Singer, atty.

Dec. 29, 1931.  C. G. GARRARD  1,838,304
MACHINE TOOL
Filed Sept. 23, 1929  2 Sheets-Sheet 2
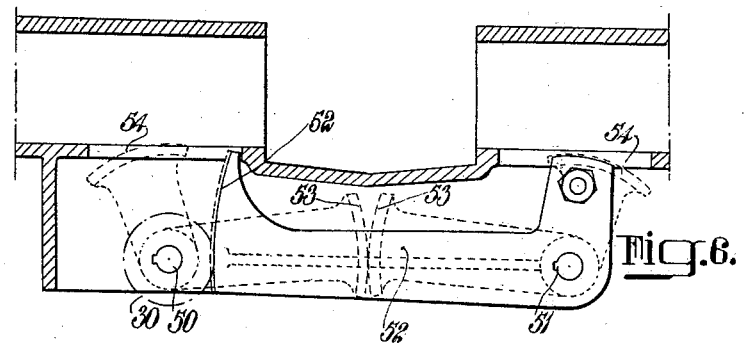
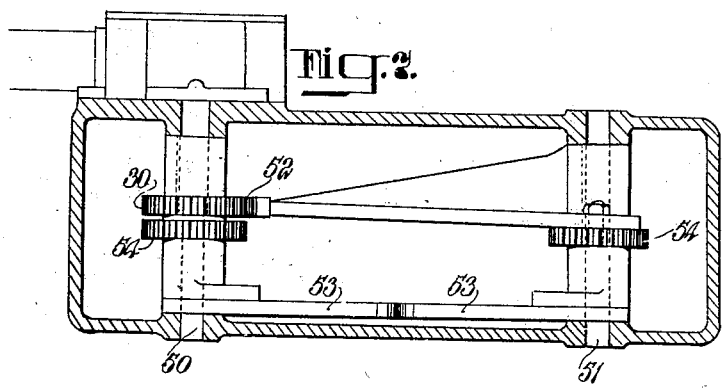
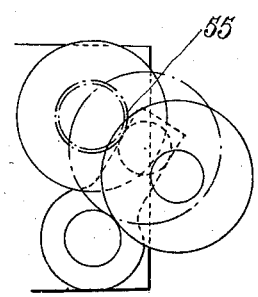
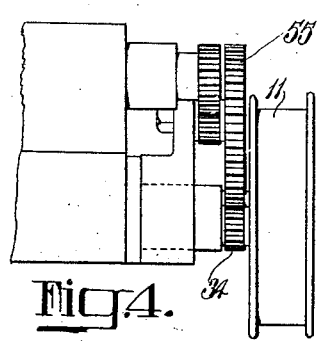

Patented Dec. 29, 1931

1,838,304

UNITED STATES PATENT OFFICE

CHARLES GEORGE GARRARD, OF THORN, NEAR DUNSTABLE, ENGLAND, ASSIGNOR TO EVERTITE LOCKNUTS LIMITED, OF LONDON, ENGLAND, A COMPANY OF GREAT BRITAIN

MACHINE TOOL

Application filed September 23, 1929, Serial No. 394,704, and in Great Britain October 3, 1928.

This invention relates to machine tools and has for a general object the provision of improvements in methods and means for effecting operation and control thereof.

It is already known to provide in machines generally "servo-motor" mechanisms whereby effort, such as may be required to effect feeding of a tool or the like, is obtained through suitable clutch means from a power device and may be under close manual control, being in some cases dependent upon the maintaining of a comparatively light manual effort upon means in operative connection with the clutch means for bringing the power effort into effect. Further, in a machine tool wherein feeding pressure is applied to a tool by manual effort, to avoid such pressure exceeding a determined limit there has been provided a member moved with the feed and another member driven at a certain speed dependent upon the operation being performed and other factors, and intermediate means operative in preventing the first of these members from moving faster than the second.

According to the present invention, a machine tool is provided with "servo-motor" operating and controlling means for imparting feeding movement to means such as a tool or the like, in combination with means adapted to prevent excessive speed of said movement.

In preferred forms, machine tools constructed according to the invention for the "servo-motor" portion thereof comprise a clutch means driven at a desired speed from the drive of the machine and having associated therewith clutching and unclutching means, enabling the clutch means readily to be put into operative connection with the load or disconnected therefrom and for the means for preventing the overfeeding of the tool or the like comprise a part caused to move at a desired speed, which is preferably uniform, by the drive of the machine, the movements of the said part serving as a stop to limit any excessive feeding movement. In this manner the maximum feeding movement possible is that permitted by the said moving part and if there is any tendency for the feeding speed to exceed this maximum, the servo-motor means effecting the feeding operation is held up, or caused to slip or otherwise prevented from imparting the excessive feed to the tool or the like.

The preferred servo-motor mechanism comprises a worm and worm wheel actuated by the driving machine, the worm wheel effecting the rotary movements of one part of a clutch. The other co-operating part of the clutch is operatively connected through a suitable gearing to the load, either directly or indirectly, and a handle, lever or the like with a lightly loaded spring or otherwise is provided for bringing the clutch parts into engagement to cause the drive. The handle or the like replaces the usual operating handle and when stress is removed from this handle, the clutch parts are brought out of engagement and the operation of the tools or the like stopped.

Another worm is provided for governing the cutting speed and this second mentioned worm is suitably driven from the drive of the machine, or from the first driven worm or otherwise, the two worms being driven at desired relative speeds and in desired directions. The worm wheel in mesh with this second mentioned worm is caused to rotate at a uniform speed. A disc or the like is mounted in concentric relation with this worm wheel and this disc is normally held from rotation by springs or other means and carries a suitably positioned stop thereon. In addition the disc is coupled to the worm wheel by means of free wheel mechanism adapted to slip in one direction of relative rotation. This free wheel mechanism may comprise balls or rollers cooperating with inclined recesses. When the clutch members are coupled together, an arm carried by a member concentric with the second mentioned worm wheel and carried by a sleeve or the like connected to mechanism for imparting the drive to the tools or the like, is caused to rotate. This arm in its rotation comes into contact with the stop carried by the disc which is arranged concentrically with the second worm wheel. The arm causes the disc to rotate and the maximum speed of rotation is controlled by the speed of rotation of the second worm wheel, as if the arm tends to move the disc at a greater speed, the pawl and ratchet or equivalent mechanism between this disc and its associated worm wheel come into engagement to prevent the disc being driven faster than the worm wheel.

If the drive tending to move the arm is greater than the movement of the second mentioned worm wheel, the parts of the clutch are caused to slip.

In order that the invention may be better understood it will now be described with reference to the accompanying drawings in which:—

Fig. 4 shows in outside elevation, and Fig. 5 in diagrammatic end elevation, fragmentary views illustrating driving details.

Fig. 6 shows in fragmentary sectional elevation, and Fig. 7 in fragmentary sectional plan, an adaptation to illustrate the application of the invention to a particular kind of machine tool.

Figure 1:
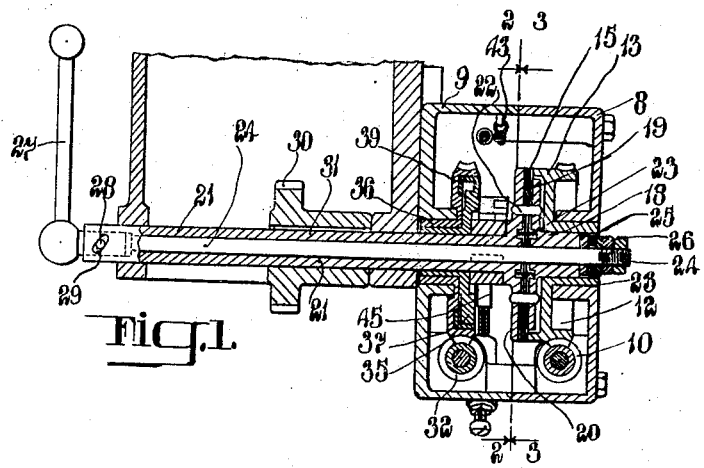
Fig. 1 shows a sectional elevation of one form of servo-motor mechanism for use with machine tools constructed according to the invention.
Figure 2:
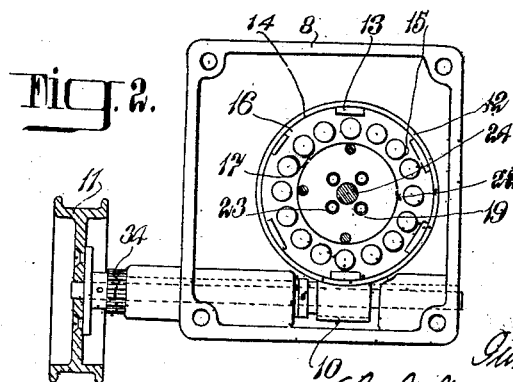
Fig. 2 shows a vertical section of Fig. 1 on the line 2—2—2—2.

Referring to Figs. 1 to 5, the device comprises a casing formed from two castings 8 and 9 suitably bolted together. The casting 8 as shown in Fig. 2 carries bearings for a shaft having mounted thereon a worm 10 driven from a pulley 11 suitably connected with the drive of the machine. The worm 10 meshes with a worm wheel 12 provided with a cylindrical extension 13, the end wall of which is notched at 14 as shown in Figs. 1 and 2.

15 is a clutch plate formed with projections 16 which fit in the notches 14 as shown. The clutch plate is in the form of a ring and carries friction corks or the like 17.

The worm wheel 12 has a sleeve-like boss in which fits the boss 18 of a clutch plate 19. 20 is another clutch plate formed with or attached to a long hollow shaft 21. The clutch plates 19 and 20 are parallel and are united together by a number of pins 22 fixed to one plate and slidable in apertures in the other plate. The pins 22 cause the two plates 19 and 20 to rotate together, but permit one to move axially with regard to the other. 23 are compression springs, the ends of which are located in recesses in the plates 19 and 20, for normally keeping the plates 19 and 20 apart. The plates 19 and 20 come one on each side of the cork or other friction members 17 carried by the plate 16, but are normally kept out of gripping contact therewith by the springs 23. 24 is a rod or spindle extending through the hollow shaft 21 and passing through a thrust bearing 25 at one end to which an adjusting nut 26 is secured, held in position by means of a locknut. The other end of the rod 24 has attached thereto a lever or handle 27. The rod 24 has a radially projecting pin 28 which passes through an inclined slot 29 in the end of the hollow shaft or sleeve 21, remote from the plate 20.

On the sleeve 21 is secured a pinion 30 by means of a feather and featherway 31 and the pinion 30 transmits the rotary movements of the sleeve 21 through suitable mechanism to the tool or the like.

This mechanism and the particular tool or tools are not shown on the drawings, but it will be understood that the mechanism may vary according to the type of machine tool or tools to which the device is applied, and that the tool or tools are also varied according to the nature of the work they have to perform. In all cases however it should be realized that there will be a reaction and inertia effect of the tool or tools and the mechanism, upon the pinion 30.

The operation of this portion of the mechanism will be readily understood. Assuming the pulley 11 is being driven and it is desired to operate the cutting tool or the like, it is simply necessary slightly to turn the handle or lever 27 in the same direction as the worm wheel 12. As the sleeve or hollow shaft 21 is held against movement by the reaction of the tool mechanism, this turning action causes the rod 24, by the pin and slot connection 28, 29 to be moved axially so that the plate 19 is caused to approach the plate 20. The pressure applied causes the plates 19 and 20 to grip the corks or the like 17 and the plates 19 and 20 are thus carried round by the plate 16, which is being rotated by the worm wheel 12 through the worm 10 from the pulley 11. The hollow shaft or sleeve 21 is thus rotated in the same direction as the handle 27, and to the same extent after the clutch members are engaged and this turns the pinion 30 and effects the necessary movements of the mechanism and cutting tool or tools. When the turning pressure is removed from the handle 27, the springs 23 cause the rod 24 to move axially in the reverse direction, taking the grip of the plates 19 and 20 from off the corks or the like 17 and stopping the movement of the tool and permitting its return to the starting position from the lever 27 or by other means.

By this action it will be appreciated that the actual manual work to be performed consists in the light manipulation of the handle or lever 27, the heavy work of cutting being carried out directly by the drive of the machine. At the same time it should be appreciated that the work is under control from the lever 27.

It is known to provide for the operation of a clutch by the turning of a spindle passing coaxially into a shaft upon which is mounted a power-driven wheel to be coupled to and decoupled from said shaft.

Figure 3:
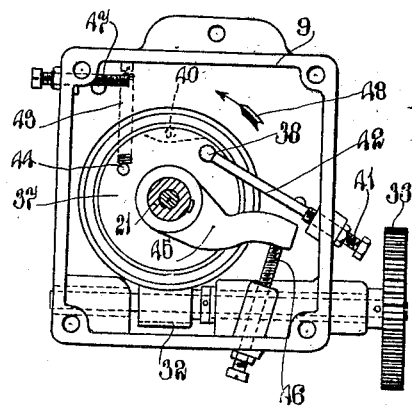
Fig. 3 shows a vertical section of Fig. 1 on the line 3—3—3—3.

To prevent overfeeding of the tool or the like, resort is made to adaptation of the device described in the Garrard patent specification No. 291,478 in connection with a machine for the production of grooves in internal bores wherein the tool feed is imparted solely by manual effort. Referring to Figs. 1 and 3 a controlling worm 32 is provided, the spindle of which is mounted in bearings in the half 9 of the main casing. This spindle is driven by a toothed wheel 33 which gears with a toothed pinion 34 on the spindle or shaft of the worm 10. The gear ratio between the toothed wheels 33 and 34 may be as desired. 35 is a worm wheel in geared relationship with the worm 32. This worm wheel 35 has a sleeve-like boss 36 mounted within an inwardly projecting bush of the casing 9.

37 is a disc mounted in an annular recess in one side of the worm wheel 35. The disc 37 is formed with a sleeve which is a running fit in the boss 36 and the disc 37 has a projection or stop 38 thereon (Fig. 3).

Between the disc 37 and the worm wheel 35, or a liner 39 to such wheel, is located a free wheel mechanism comprising a ball and inclined recess 40 as shown in Fig. 3.

41 is a screw stem screwing through a tapped aperture in the casing 9 and extending into a stem 42, the end of which can be adjustably arranged to come within the path of the stop 38. 43 is a tension spring attached at one end to the casing 9 and at the other end to a pin 44 secured to the disc 37. This tension spring normally keeps the stop pressed against the end of the stem 42.

45 is an arm or lever having a boss keyed on the hollow shaft or sleeve 21, the end of the arm working between adjustable stops 46 and 47. The stop 38 on the disc 37 projects into the path of the arm 45.

In operating this portion of the device, it will be realized that the worm wheel 35, when the machine is being driven, is constantly being driven at a certain desired uniform speed in the direction of the arrow 48 (Fig. 3). When the servo-motor mechanism is operated, the hollow shaft or sleeve 21 is caused to rotate and this moves the arm 45 towards the stop 38. This movement can be at any desired speed and while it is taking place the pinion 30 through the intervening mechanism is causing the tool or the like to approach the work, that is to say the actual cutting position, for example it is causing a drill to be moved from its position of rest to the metal or the like to be operated upon, or it is causing a cutting tool of other type to be moved from its position of rest to the cutting position. Just prior to the tool coming into operation, the arm 45 contacts with the stop 38. The disc 37 after this is caused to move by the arm 45 pressing on the stop 38, and the disc moves against the action of the spring 43. If the angular velocity of the rotary disc is less than the angular velocity of the worm wheel 35, the feed of the tool is not interrupted; if the angular velocity of the disc equals the angular velocity of the worm wheel 35, also the feed is not interrupted, but if there is any tendency for the angular velocity of the disc to exceed that of the worm wheel, then the free wheel mechanism 40 comes into action and the disc 37 is locked to the worm wheel 35 and prevented from having an angular velocity greater than that of the worm wheel. In this manner the feed of the tool during cutting is governed and controlled so that it does not exceed a certain maximum. In the case of tendency to overfeed the tool, consequently it will be realized that the parts of the clutch 19, 20 and 16, 17 slip to compensate for the overfeeding of the worm 10.

As before stated, the spindles of the worms 10 and 32 may be intergeared in any suitable manner and the gear ratio may be changed as desired, for example in a manner similar to that employed with a lathe by the usual "banjo" or equivalent change gear 55 as shown in Figs. 4 and 5.

Fig. 4 shows the pulley 11, but in Fig. 5 it is omitted for the sake of clearness, although in both figures the toothed pinion 34 is diagrammatically represented.

As before stated, the ratio between the wheel 34 and the toothed wheel 33 on the spindle of the worm 32 may be as desired and as represented in Fig. 5 the rocking arm 55$^a$ of the gear may carry a shaft having two gear wheels thereon, the larger of which gears directly with the pinion 34 and the smaller with the pinion 33, or else by swinging down the arm its small gear in place of engaging directly with the pinion 33 may engage with a larger toothed wheel 33$^a$ mounted upon the same spindle, the whole being similar to the gearing of an ordinary lathe.

As an example of a machine in which the mechanism shown in Figs. 1, 2 and 3 can be utilized, reference is made to specification No. 291,478 in the name of Garrard. The machine shown in this specification is pedal-operated, but the pedal 22 can be dispensed with and the pinion 30 mounted to turn loosely upon the left hand spindle numbered in the previous specification 32, but numbered 50 in Fig. 6 of the present specification. In Figs. 6 and 7 the spindle 50 is only shown in a diagrammatic manner and it should be understood that this spindle 50 represents the hollow shaft 21 with the handle-controlled rod or spindle 24 extending therethrough, the pinion 30 being keyed to the outer sleeve portion driven as before explained through the clutch drive.

The other parallel spindle 51 is formed solid and has keyed thereon a long quadrant 52, the teeth of which mesh with the teeth of the pinion 30. Upon the spindle 51 are keyed two quadrants 53 and 54 and on the exterior of the spindle 50 are loosely mounted other similar quadrants 53 and 54 which are connected together to move as one, the two quadrants 53 being of equal length and intermeshing and replacing the two quadrants 33 in the before mentioned specification, and the two quadrants 54 replacing the quadrants 31 of the previous specification, and operating the movements of the barrels or the like 26 in this specification.

The action of the mechanism is as follows:

The pinion 30 receives its movements as before explained and the movements cause the quadrant 52 to be moved, a mechanical reduction being given, due to the respective radii of the parts. The quadrant 52 turns the right hand spindle 51 and with it the quadrant 54 keyed thereto and a corresponding but opposite movement is imparted to the left hand quadrant 54 through the intermeshing quadrants 53. As a consequence the quadrants 54 are enabled to effect the necessary feeding movements of the tool carriers.

In the particular adaptation of the invention to the machine in the before mentioned specification, although the actual pedal 22 is dispensed with, it should be observed that the pedal lever oscillating about the quadrant 23 should be retained to cause the operation of the clamping device for the nut or the like by means of the rod 21.

The invention is not limited to the precise forms or details of construction described, as these may be varied to suit particular cases.

What I claim and desire to secure by Letters Patent of the United States of America is:—

1. In a machine tool, the combination with "servo-motor" operating means for controlled manipulation of a tool including means for driving the machine, clutch means having a driving part driven from the machine, a driven part operatively connected with the tool and operator controlled means for operation of the clutch, of a controlling member driven at uniform speed, a member moved in synchronism with the tool and in the same sense as said uniformly driven member, an intermediate member movable by and with said synchronously-moved member and means adapted positively to lock said intermediate member against said uniformly driven member when their respective speeds are equal.

2. In a machine tool, the combination with "servo-motor" operating means for controlled manipulation of a tool including means for driving the machine, clutch means having a rotary driving part driven from the machine, a rotary driven part operatively connected with the tool and operator controlled means for engagement and disengagement of the clutch parts, of a rotary controlling member driven at a determined uniform speed, a member moved in synchronism with the tool and rotated in the same sense as said uniformly driven member, an intermediate member engageable by and rotatable with said synchronously-moved member and one-way acting rotary clutch means adapted for locking said intermediate member positively against said uniformly driven member when their respective speeds are equal.

3. In a machine tool, "servo-motor" and other operating means for imparting a feeding movement under control to a tool, comprising means for driving the machine, a tool adapted to be driven at required times by the machine, a friction clutch having a driving part driven from the machine and a driven part operatively connected through suitable mechanism with the tool, means under control of the operator for effecting engagement or disengagement of the driving and driven parts of the clutch, a controlling member driven at a uniform speed from the machine, a disc mounted to turn coaxially with the uniformly driven member, a stop carried by the disc at a desired distance from the axis of rotation, free wheel mechanism coupling the disc with the said uniformly driven member, and a second controlling member operatively connected to the driven part of the clutch and adapted to move synchronously with the feed of the tool by the servo-motor mechanism, said second controlling member being adapted to contact with the said stop and to move the same at a speed below or up to the speed of the uniformly driven member, for the purposes set forth.

4. In a machine tool, "servo-motor" and other operating means for imparting a feeding movement under control to a tool, comprising means for driving the machine, a tool adapted to be driven at required times by the machine, a friction clutch having driving and driven parts, worm and worm wheel gearing driven from the machine and operatively connected to the driving part of the clutch, the driven part of the clutch being operatively connected through suitable mechanism with the tool, spring means normally for keeping the parts of the clutch out of driving engagement, means under control of the operator for effecting engagement or disengagement of the clutch, a controlling member driven at a uniform speed from the machine, a disc mounted to turn coaxially with the uniformly driven member, a stop carried by the disc at a desired distance from the axis of rotation, free wheel mechanism coupling the disc with the said uniformly driven member, and a second controlling member operatively connected to the driven part of the clutch and adapted to move synchronously with the feed of the tool by the servo-motor mechanism, said second controlling member being adapted to contact with the said stop and to move the same at a speed below or up to the speed of the uniformly driven member, for the purposes set forth.

5. In a machine tool, "servo-motor" and other operating means for imparting a feeding movement under control to a tool, comprising means for driving the machine, a tool adapted to be driven at required times by the machine, a friction clutch having driving and driven parts, worm and worm wheel gearing driven from the machine and operatively connected to the driving part of the clutch, the driven part of the clutch being operatively connected with the tool and carried by a hollow shaft, an operating rod passing through the said hollow shaft and carrying an operating lever, the rod being operatively connected to the hollow shaft by a pin on the rod engaging in an inclined slot in the said shaft for enabling the rotation of the operating lever to effect axial movement of the rod, means in association with the rod for effecting the engagement and disengagement of the said clutch parts by the said axial movement, a controlling member driven at a uniform speed from the machine, a disc mounted to turn coaxially with the uniformly driven member, a stop carried by the disc at a desired distance from the axis of rotation, free wheel mechanism coupling the disc with the said uniformly driven member, and a second controlling member operatively connected to the driven part of the clutch and adapted to move synchronously with the feed of the tool by the servo-motor mechanism, said second controlling member being adapted to contact with the said stop and to move the same at a speed below or up to the speed of the uniformly driven member, for the purposes set forth.

6. In a machine tool, "servo-motor" and other operating means for imparting a feeding movement under control to a tool, comprising means for driving the machine, a tool adapted to be driven at required times by the machine, a friction clutch having driving and driven parts, worm and worm wheel gearing driven from the machine and operatively connected to the driving part of the clutch, the driven part of the clutch being operatively connected with the tool and carried by a hollow shaft, an operating rod passing through the said hollow shaft and carrying an operating lever, the rod being operatively connected to the hollow shaft by a pin on the rod engaging in an inclined slot in the said shaft for enabling the rotation of the operating lever to effect axial movement of the rod, means in association with the rod for effecting the engagement and disengagement of the said clutch parts by the said axial movement, a controlling member driven at a uniform speed from the machine, a disc mounted to turn coaxially with the uniformly driven member, a stop carried by the disc at a desired distance from the axis of rotation, free wheel mechanism coupling the disc with the said uniformly driven member, a lever arm, having a rest position, mounted upon and to turn with the hollow shaft and adapted to move synchronously with the feed of the tool by the servo-motor mechanism, said second controlling member being adapted to contact with the said stop and to move the same at a speed below or up to the speed of the uniformly driven member, and means for normally maintaining the stop a desired angular and adjustable distance from the rest position of the lever arm, for the purposes set forth.

7. In a machine tool, "servo-motor" and other operating means for imparting a feeding movement under control to a tool, comprising means for driving the machine, a tool adapted to be driven at required times by the machine, a friction clutch having driving and driven parts, worm and worm wheel gearing driven from the machine and operatively connected to the driving part of the clutch, the driven part of the clutch being operatively connected with the tool and carried by a hollow shaft, an operating rod passing through the said hollow shaft and carrying an operating lever, the rod being operatively connected to the hollow shaft by a pin on the rod engaging in an inclined slot in the said shaft for enabling the rotation of the operating lever to effect axial movement of the rod, means in association with the rod for effecting the engagement and disengagement of the said clutch parts by the said axial movement, a controlling member driven at a uniform speed from the machine, a disc mounted to turn coaxially with the uniformly driven member, a stop carried by the disc at a desired distance from the axis of rotation, free wheel mechanism coupling the disc with the said uniformly driven member, a lever arm, having a rest position, mounted upon and to turn with the hollow shaft and adapted to move synchronously with the feed of the tool by the servo-motor mechanism, said second controlling member being adapted to contact with the said stop and to move the same at a speed below or up to the speed of the uniformly driven member, means for normally maintaining the stop a desired angular and adjustable distance from the rest position of the lever arm, and spring means for returning the stop to its normal position when the lever arm returns to the rest position, for the purposes set forth.

In witness whereof I affix my signature.

CHARLES GEORGE GARRARD.